United States Patent [19]

Iryo et al.

[11] Patent Number: 4,930,879
[45] Date of Patent: Jun. 5, 1990

[54] SYNTHETIC RESIN LENS

[75] Inventors: Takeaki Iryo; Satoshi Kubota, both of Nagano; Yoshio Sano, Okaya; Yoshishige Murata, Tsukuba; Yasumi Koinuma, Oita, all of Japan

[73] Assignees: Nippon Oil and Fats Co., Ltd.; Seiko Epson Corp., both of Japan

[21] Appl. No.: 249,314

[22] Filed: Sep. 26, 1988

Related U.S. Application Data

[63] Continuation-in-part of Ser. No. 27,562, Mar. 18, 1987, abandoned.

[51] Int. Cl.$^5$ .............................................. G02B 3/00
[52] U.S. Cl. .................................. 350/409; 524/493; 526/292.4; 526/314
[58] Field of Search ................ 350/409; 428/412, 413, 428/447, 520; 351/166

[56] References Cited

U.S. PATENT DOCUMENTS 2,366,495  1/1945  D'Alelio .............................. 526/321
4,273,802  6/1981  Kamada ............................. 427/54.1

Primary Examiner—Christopher Henderson
Attorney, Agent, or Firm—Majestic, Parsons, Siebert & Hsue

[57] ABSTRACT

A Synthetic resin lens having a surface hard coating comprises a synthetic resin lens body and a surface hard coat deposited on the lens body. The synthetic resin lens body is made of a resin obtained by copolymerizing monomers consisting essentially as synthetic resinous components of 10 to 80 percent by weight of at least one diester of itaconic acid and mesaconic acid, 10 to 80 percent by weight of at least one allyl compound and 5 to 50 percent by weight of diethyleneglycol bis(allylcarbonate). The surface hard coat is formed by curing a coating composition comprising 50 to 800 parts by weight of at least one organic silicon compound, 100 parts by weight of colloidal silica, 50 to 600 parts by weight of a polyfunctional compound such as a polyfunctional epoxy compound, a polyalcohol, a polycarboxylic acid, or a polycarboxylic anhydride and 0.01 to 5.0 percent by weight of a curing catalyst based on the residual solids in the composition after curing.

18 Claims, No Drawings

SYNTHETIC RESIN LENS

CROSS-REFERENCE TO RELATED APPLICATION

This application is a continuation-in-part application of application Ser. No. 27562 filed Mar. 18, 1987, which is now abandoned pursuant to the filing of a File Wrapper Continuation Application under Rule 1.62. The continuation application Ser. No. 418,813 was filed Oct. 3, 1989, and is co-pending with this application.

BACKGROUND OF THE INVENTION

This invention relates to a synthetic resin lens and, more particularly, to a synthetic resin lens having a surface hard coating.

A synthetic resin lens, especially a diethylene glycol bis(allylcarbonate) resin lens, has excellent safety, machinability and fashionableness when compared with glass lens, and has become popular at a rapid rate in keeping with evolution of hard coat techniques, and anti-reflection techniques. As eyeglass lenses are recently produced from plastic materials, there is an increasing demand for thin type plastic lenses formed of a high refractive index resin material. The refractive index of diethyleneglycol bis (allylcarbonate) resin is 1.50, and some proposals have been made for obviating the deficiency. For example, Japanese Laid-open Patent Publication No. 41965/1979 discloses an example of a copolymer of diethyleneglycol bis(allylcarbonate) and benxylmethacrylate, Japanes Laid-open Patent Publication No. 77686/1979 discloses an example of a copolymer of diethyleneglycol bis (allylcarbonate) with 4-iodostyrene and Japanese Laid-open Patent Publication No. 15513/1983 discloses an example of a copolymer of diallylisophthalate or diallylterephthalate with a methylmethacrylate prepolymer. In these cases, problems are presented in connection with lens manufacture in that the allyl groups are reacted with (metha)acrylic or vinyl groups different in reactivity from the allyl groups. That is, the (metha)acrylic or vinyl groups having a higher reaction rate are polymerized first and the allyl groups having a lower reaction rate are polymerized subsequently such that not only the desired copolymerization is not achieved, but the allyl compounds are not polymerized completely, with the result that the solvent resistance is lowered.

As other examples, Japanese Laid-open Patent Publication No.13747/1980 shows an example of a copolymer of bisphenol A dimethacrylate with phenylmethacrylate or benzylmethacrylate, while Japanese Laid-open Patent Publication No.54901/1982 and Japanese Laid open Patent Publication No.18602/1983 show an example of a copolymer of a styrene base monomer with di(metha)acrylate having a halogen-substituted aromatic ring and an allyl compound or di(metha)acrylate. In these cases, although the (metha)acrylic groups and the vinyl groups have similar reactivities to each other, certain difficulties are presented in supervising the process of lens manufacture. That is, because of the higher reaction rate, the casting conditions are difficult to control such that distortions may be caused in the interior and on the surface of the lens with resulting optical defects. In addition, the vinyl or (metha)acrylic groups are highly sensitive with respect to the reaction and may be easily affected by external conditions such that the reaction can be controlled only with extreme difficulties except by changing the polymerization conditions. The result is that the process becomes necessarily complicated because of the difficulties in the polymerization reaction and in view of satisfactorily completing the polymerization reaction. Also, when the monofunctional monomers are employed as a main component in the above prior-art examples, since it is impossible for the monomers to be completely polymerized and incorporated into the polymer chain, it may occur that the heat- and solvent resistance of the copolymer may be occasionally affected by the unreacted monomers.

These manufacture difficulties may be obviated to some extent in a further example, namely a copolymer of a diallyl compound having a halogen-substituted aromatic ring with diallylterephthalate or diallylorthophthalate. In the present example, since the reaction is rather easy to control, and since all the monomers are bifunctional, the process including mixing of the solutions and the polymerization of the solutions can be supervised rather easily, so that a high refractive index synthetic resin lens may be obtained with good optical qualities. However, because of the higher specific gravity of the diallyl compound having the halogen-substituted aromatic ring as the main component, which is as high as about 1.7 as the polymer, the lens is increased in weight such that the merit of the high refractive index lens is lost. Also, the diallyl compound having the halogen-substituted aromatic ring does not lend itself to the purpose of mass production since the costs in the synthesis and purification thereof are higher than in the case of ethyleneglycol bis (allylcarbonate) or other synthetic resins for lenses, even when taking into account the merit of the high refractive index proper to such a compound.

The problem common to bisphenol A dimethacrylate, di(metha)acrylate or the diallyl compound having the halogen-substituted aromatic ring employed in the above examples is the high susceptibility of the monomers being precipitated. In many cases, these monomers are dissolved in monomers with which they are copolymerized. However, the contents of the monomers are limited because the monomers tend to be precipitated easily even at room temperature when dissolved in more than a predetermined amount. Since it is necessary to maintain the temperature higher than a predetermined temperature, and polymerization initiators must be selected from a narrow range of materials, the manufacture process is difficult to control, starting from mixing to polymerization of the solutions.

For overcoming the aforementioned inconveniences, there is also proposed an example of a copolymer of a diester of fumaric acid having an aromatic ring with an acrylic compound or an allyl compound. However, since the proposed copolymer is inferior to the composition of the present invention with respect to the polymerization degree, it cannot exhibit sufficient properties with respect to durability, such as solvent- and impact resistance under hostile conditions.

SUMMARY OF THE INVENTION

It is a principal object of the present invention to provide a synthetic resin lens which exhibits good adhesion between a main body of the lens and a surface hard coat, and which is light in weight, high in refractive index and less liable to be colored and can be molded easily.

It is another object of the present invention to provide a synthetic resin lens which is superior in abrasion-, heat-, impact-, hot water- and solvent-resistances, chemical resistance, weather proof and antistatic properties.

It is a further object of the present invention to provide a synthetic resin lens in which the reaction can be controlled easily because the reaction rates of the monomers are low and close to one another, polymerization initiators can be selected from a wide range of materials, and in which the operation of polymerization and the process control can be performed easily.

It is still another object of the present invention to provide a synthetic resin lens having a tintable surface hard coat.

The above and other objects of the present invention will become apparent from the following description of the invention.

According to the present invention, there is provided a synthetic resin lens having a surface hard coating comprising:
a synthetic resin lens body; and
a surface hard coat deposited on the lens body; the synthetic resin lens body being made of a resin obtained by copolymerizing monomers consisting essentially as synthetic resinous components of;
10 to 80 percent by weight of at least one diester of dicarboxylic acid having the following formula (1) of $$\begin{array}{c}R^1\\ \diagdown\\ \phantom{xx}C=C\\ \diagup\phantom{xxx}\diagdown\\ H\phantom{xxxx}C-O-CH_2-\phantom{x}\\ \phantom{xxxxxx}\parallel\\ \phantom{xxxxxx}O\end{array}\begin{array}{c}CH_2-R^2\\ \\ \\ \\ \\ \end{array}\phantom{xxx}\bigodot_X \qquad (1)$$

wherein $R^1$ and $R^2$ are different groups, one of $R^1$ and $R^2$ being a hydrogen atom, the other being $$-\underset{\parallel}{\underset{O}{C}}-O-CH_2-\bigodot_X$$

and X represents a hydrogen atom, a chlorine atom, a bromine atom or an iodine atom;
10 to 80 percent by weight of at least one allyl compound having the following formula (2) of $$R^3+\underset{\parallel}{\underset{O}{C}}-O-CH_2-CH=CH_2)_2 \qquad (2)$$

wherein $R^3$ represents $-O-CH_2-CH_2)_n-O-$, $$-\bigodot-\bigodot- \text{ or } -\bigodot-$$

and n represents an integer of 1 or 3, and
5 to 50 percent by weight of diethyleneglycol bis(allylcarbonate).
the surface hard coat being formed by curing a coating composition comprising;
50 to 800 parts by weight of at least one organic silicon compound having the following formula (3) of $$R^4-\underset{\underset{\displaystyle R^5_a}{|}}{Si}(OR^6)_{3-a} \qquad (3)$$

wherein $R^4$ represents a hydrocarbon group having 1 to 6 carbon atoms, or an organic group including a vinyl group, a methacryloxy group, or an epoxy group, $R^5$ represents a hydrocarbon group having 1 to 4 carbon atoms, $R^6$ represents a hydrogen atom, a hydrocarbon group having 1 to 5 carbon atoms or an alkoxyalkyl group and the symbol a represents an integer of 0 or 1,
100 parts by weight of colloidal silica having a particle size of 1 to 100 millimicrons,
50 to 600 parts by weight of a polyfunctional compound selected from the group consisting of a polyfunctional epoxy compound, a polyalcohol, a polycarboxylic acid, a polycarboxylic anhydride and mixtures thereof, and
0.01 to 5.0 percent by weight of a curing catalyst based on the residual solids in the composition after curing.

DESCRIPTION OF THE INVENTION

The present invention will be described in detail hereinbelow.

A synthetic resin lens having a surface hard coating according to the present invention is comprised of a synthetic resin lens body and a surface hard coat deposited on the lens body. The synthetic resin lens body is made of a resin obtained by copolymerizing monomers consisting essentially as synthetic resinous components of 10 to 80 percent by weight of at least one diester of dicarboxylic acid having the following formula (1) of $$\begin{array}{c}R^1\\ \diagdown\\ \phantom{xx}C=C\\ \diagup\phantom{xxx}\diagdown\\ H\phantom{xxxx}C-O-CH_2-\phantom{x}\\ \phantom{xxxxxx}\parallel\\ \phantom{xxxxxx}O\end{array}\begin{array}{c}CH_2-R^2\\ \\ \\ \\ \\ \end{array}\phantom{xxx}\bigodot_X \qquad (1)$$

wherein $R^1$ and $R^2$ are different groups, one of $R^1$ and $R^2$ being a hydrogen atom, the other being $$-\underset{\parallel}{\underset{O}{C}}-O-CH_2-\bigodot_X$$

and X represents a hydrogen atom, a chlorine atom, a bromine atom or an iodine atom;
10 to 80 percent by weight of at least one allyl compound having the following formula (2) of $$R^3+\underset{\parallel}{\underset{O}{C}}-O-CH_2-CH=CH_2)_2 \qquad (2)$$

wherein $R^3$ represents $-(O-CH_2-CH_{2n}-O-$,

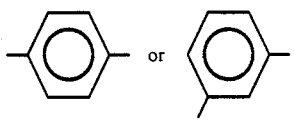

and n represents an integer of 1 or 3, and 5 to 50 percent by weight of diethyleneglycol bis(allylcarbonate).

The diester of dicarboxylic acid represented by the formula (1) wherein X in the formula is a chlorine atom is desirable in the refractive index and durability, whereas the same diester wherein X in the formula is a hydrogen atom is also desirable in coloration and water resistance and specific gravity. Examples of the diester of dicarboxylic acid represented by the formula (1) preferably include dibenzyl itaconate, di-o chlorobenzyl itaconate, di-p-chlorobenzyl itaconate, di-o-bromobenzyl itaconate, dibenzyl mesaconate, di-o chlorobenzyl mesaconate, di-p-chlorobenzyl mesaconate, di-o-bromobenzyl mesaconate and mixtures thereof.

Examples of allyl compounds represented by the formula (2) preferably include diallyl isophthalate, diallyl terephthalate and mixtures thereof. Although the allyl compound represented by the general formula (2) can be molded into a lens when polymerized alone, the resulting lens is inferior with respect to coloration and adhesion to the surface coat. Since the allyl compound having the formula (2) is a diallyl compound, it has good copolymerizability with the diester of dicarboxylic acid of the formula (1), while the reaction can be controlled more easily. Since the allyl compound of the formula (2) is bifunctional, it forms a three-dimensional cross-linked structure, so that there is only a small amount of unreacted monomers that are not bonded to the molecular chains.

The mixing ratios of the diester of dicarboxylic acid represented by the formula (1) and the allyl compound represented by the general formula (2) are determined in consideration of various factors such as refractive index, Abbe's number, heat-, impact- and solvent resistances, tintability and coloration of the synthetic resin lens, precipitation temperatures of the diester of dicarboxylic acid of the formula (1) or the decomposition temperature of the polymerization initiators. Taking into account of the fact that the lens to be produced is formed of a high refractive index resin, and for improving the durability, it is necessary that the contents of the diester of dicarboxylic acid be in the range of from 10 to 80 percent by weight and those of the allyl compound similarly be in the range of from 10 to 80 percent by weight.

According to the present invention, diethylene glycol bis(allylcarbonate) is used as the resinous component for improving the adhesion between the surface hard coat and the synthetic resin lens body. With the composition ratio of less than 5 percent by weight, adhesion is only insufficient. With the composition ratio in excess of 50 percent by weight, refractive index is significantly lowered.

There is no specific limitation on the kinds of the polymerization initiators employed in accordance with the present invention, and any radical polymerization initiators known in the art may be employed. These polymerization initiators may include hydroperoxides such as t-butyl hydroperoxide; dialkylperoxides such as di-t-butyl peroxide; diacylperoxides such as benzoyl peroxide; peroxydicarbonates such as diisopropylperoxy dicarbonate; peroxyesters such as t-butylperoxypivalate; peroxides such as ketone peroxide or peroxyketal; and azo compounds such as azobis(isobutylylonitrile. Although the amount of the radical polymerization initiators employed may vary in dependence upon the monomer compositions of the copolymerization components. precipitation temperatures, prepolymerization conditions and the conditions for thermal polymerization in the mold, and hence cannot be determined monistically, they are preferably employed in the range of from 0.1 to 5.0 percent by weight.

In the course of molding by casting, additives such as, for example, UV ray absorbers, antioxidants, antistatic agents, dyestuffs, pigments, fluorescent agents, photochromic substances, various stabilizers and mold release agents, may be employed as occasion may require for imparting various properties to the lens and improving the reaction process.

The surface hard coat deposited on the synthetic resin lens body will be explained. The surface hard coat employed in the present invention is formed by curing a coating composition comprising;

50 to 800 parts by weight of at least one organic silicon compound having the following formula (3) of

wherein $R^4$ represents a hydrocarbon group having 1 to 6 carbon atoms, or an organic group including a vinyl group, a methacryloxy group, or an epoxy group, $R^5$ represents a hydrocarbon group having 1 to 4 carbon atoms, $R^6$ represents a hydrogen atom, a hydrocarbon group having 1 to 5 carbon atoms or an alkoxyalkyl group and the symbol a represents an integer of 0 or 1, 100 parts by weight of colloidal silica having a particle size of 1 to 100 millimicrons, 50 to 600 parts by weight of a polyfunctional compound selected from the group consisting of a polyfunctional epoxy compound, a polyalcohol, a polycarboxylic acid, a polycarboxylic anhydride and mixtures thereof, and 0.01 to 5.0 percent by weight of a curing catalyst based on the residual solids in the composition after curing.

The organic silicon compounds represented by the formula (3) include methyltrimethoxysilane, ethyltriethoxysilane, methyltriethoxysilane, phenyltriethoxysilane, dimethyldimethoxysilane, phenylmethyldimethoxysilane, vinyltriethoxysilane, vinyltris-(β-methoxyethoxy)silane, vinyltriacetoxysilane, γ-glycidoxypropyltrimethoxysilane, γ-glycidoxypropylmethyldiethoxysilane and β-(3,4-epoxycyclohexyl)-ethyltrimethoxysilane. These compounds may be used singly or two or more of the compounds may be used as a mixture. The organic silicon compounds employed are preferably hydrolyzed in organic solvents, such as alcohols. in the presence of acids. The organic silicon compounds may be hydrolyzed singly and mixed with colloidal silica, one of the components of the coating composition, or may be mixed with colloidal silica and hydrolyzed subsequently. The colloidal silica should have a particle size ranging from 1 to 100 millimicrons and are preferably employed as a colloidal solution in which fine particles of macromolecular inorganic silicic acid are dispersed in water or alcoholic dispersion medium. The colloidal silica employed may be any one of those available on the market.

The polyfunctional compound, as one of the components of the coating composition, is selected from the group consisting of polyfunctional epoxy compounds, polyalcohols, polycarboxylic acids, polycarboxylic anhydrides and mixtures thereof. Examples of the polyfunctional epoxy compounds include diglycidyl ethers of bifunctional alcohols, such as (poly)ethyleneglycol, (poly)propyleneglycol, neopentylglycol, catechol, resorcinol or alkyleneglycol, and di- or triglycidyl ethers of trifunctional alcohols, such as glycerin or trimethylolpropane.

The polyfunctional alcohols include bifunctional alcohols, such as (poly)ethyleneglycol, (poly)propyleneglycol, neopentylglycol, catechol, resorcinol or alkanediol; trifunctional alcohols such as glycerin or trimethylolpropane, and polyvinyl alcohol. The polycarboxylic acids include malonic acid, succinic acid, adipic acid, azelaic acid, maleic acid, o-phthalic acid. terephthalic acid, fumaric acid, itaconic acid and oxaloacetic acid. The polycarboxylic anhydrides include succinic anhydride, maleic anhydride, itaconic anhydride, 1,2-dimethylmaleic anhydride, phthalic anhydride, hexahydrophthalic anhydride and naphthalic anhydride.

According to the present invention, a curing catalyst is employed as one of the components of the coating composition. The curing catalyst is the curing catalyst for silanol or epoxy groups. Examples of the curing agent include amines such as n-butylamine, triethylamine, guanidine or biguanide; amino acids such as glycine; metal acetyl acetonates such as aluminum acetyl acetonate, chromium acetyl acetonate, titanyl acetyl acetonate or cobalt acetyl acetonate; metal salts of organic acids such as sodium acetate, zinc naphthenate, cobalt naphthenate, zinc octylate or tin octylate; perchloric acids and salts thereof, such as perchloric acid, ammonium perchlorate or magnesium perchlorate; acids such as hydrochloric acid, phosphoric acid, nitric acid or paratoluene sulphonic acid; and metal chlorides of Louis acids such as $SnCl_2$, $AlCl_3$, $FeCl_3$, $TiCl_4$, $ZnCl_2$ or $SbCl_3$. By using the curing catalyst, the coating with superior hot water resistance, tintability, chemical resistance and weather proof properties and the coating composition with extremely long pot life may be obtained.

The relative ratios of the respective components employed in the present invention are 50 to 800 parts by weight and preferably 50 to 500 parts by weight of the organic silicon compounds, in terms of the solid contents computed as

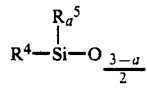

and 50 to 600 parts by weight and preferably 100 to 500 parts by weight of the polyfunctional compound, based on 100 parts by weight of the colloidal silica, in terms of the solid contents computed as $SiO_2$. The curing catalyst is employed in an amount 0.01 to 5.0 percent by weight based on the residual solid contents in the composition after curing.

Also, one or more solvents such as alcohols. ketones, cellosolves or carboxylic acids, may be added either solely or as a mixture. If necessary, small amounts of surfactants, antistatic agents or UV ray absorbers may also be added for improving the coatability of the coating solution or the performance of the coating.

Although the synthetic resin lens material of the present invention exhibits superior adhesion to the coating. the material surface may also be treated previously with alkalis, acids, surfactants, primers or plasma for improving the adhesion.

The synthetic resin lens of the present invention is coated uniformly with the coating solution by the dipping, spinner, spray or flow methods, after which the coating solution is cross-linked and cured by heating and drying to form the coating. The coating thickness is preferably in the range of from 1 to 30 microns. With the coating thickness less than 1 micron, the coating is insufficient in abrasion resistance. On the other hand, with the coating thickness in excess of 30 microns, the coating is susceptible to cracking.

EXAMPLES OF THE INVENTION

The present invention will be explained with reference to certain Experiments and Examples, which are not to be interpreted in the sense of limiting the invention. It is noted that parts in the Experiments and Examples are indicated as those by weight.

Experiments

Preparation of Material of Synthetic Resin Lens (a) 10 parts of dibenzyl itaconate, 10 parts of dibenzyl mesaconate, 30 parts of diethyleneglycol bis(allylcarbonate) and 50 parts of diallyl isophthalate were mixed and stirred together. To the resulting mixture was added 0.1 part of 2-(2'-hydroxy-5'-methylphenyl)benzotriazole as a UV ray absorber. To the resulting mixture were added 2.8 parts of diisopropyl peroxydicarbonate (Peroyl IPP; prepared by Nippon Oil and Fats Co., Ltd.) and the resulting mixture was stirred thoroughly. An undissolved portion of the mixture was filtered off and the remaining portion was cast into a space defined by a glass mold designed for providing the lens power of −6.00 D (dioptry) and a gasket of ethylene-vinyl acetate copolymer designed to provide a center thickness of 2.0 mm.

The polymerization was continued in a constant temperature vessel at 40° C. for 5 hours, at 40° to 50° C. for 10 hours and at 100° C. for 2 hours, after which the glass mold and the gasket were removed from the lens. When the lens having the diameter of 75 mm and the power of −6.00 D was cast and polymerized by this method, the rate of occurrence of poor adhesion between the glass mold and the lens was less than 0.1%. The lens was then post-cured at 100° C. for two hours to relieve the strain in the lens interior. The obtained lens exhibited good optical surface state, and was free of the inner strain and satisfactory as the optical material.

(b) 30 parts of dibenzyl itaconate, 10 parts of diethyleneglycol bis(allylcarbonate) and 60 parts of diallyl terephthalate were mixed and stirred together. To the resulting mixture was added 0.2 part of 2-hydroxy-4-methoxybenzophenone. To the resulting mixture were then added 3.0 parts of dinormalpropylperoxydicarbonate (Perloyl NPP; prepared by Nippon Oil and Fats Co., Ltd.) and mixed thoroughly. After an undissolved portion of the mixture was filtered off, the casting and polymerization were performed by the same operation as at (a).

(c) 30 parts of dibenzyl itaconate, 10 parts of diethyleneglycol bis(allylcarbonate) and 60 parts of diallyl isophthalate were mixed and stirred together and 0.2 part of 2-hydroxy-4-methoxybenzophenone was added to the resulting mixture. 3.5 parts of benzoyl peroxide (Niper B; prepared by Nippon Oil and Fats Co. Ltd.) were added to the resulting mixture and mixed thoroughly. An undissolved portion of the mixture was filtered off and the remaining portion was polymerized in a glass mold.

The polymerization was continued in a constant temperature vessel at 51° C. for 4 hours, at 55° C. for 4 hours, at 60° C. for 3.5 hours, at 65° C. for 3 hours, at 71° C. for 2.5 hours, at 75° C. for 2.5 hours, at 79° C. for 2 hours, at 84° C. for one hour and at 90° C. for two hours. The ensuing operation was performed in the same way as at (a).

(d) 10 parts of di-o-chlorobenzyl itaconate, 10 parts of di-o-chlorobenzyl mesaconate, 10 parts of diethyleneglycol bis (allylcarbonate) and 40 parts of diallyl isophthalate were mixed and stirred together and 0.2 part of ethyl-2-cyano-3,3-diphenylacrylate was added to the resulting mixture, to which 2.9 parts of di-2-ethylhexylperoxydicarbonate (Perloyl OPP; prepared by Nippon Oil and Fats Co., Ltd.) were added and mixed thoroughly. An undissolved portion of the mixture was filtered off and the remaining portion was cast into the mold and polymerized in the same way as at (a).

(e) 30 parts of di-o-bromobenzyl itaconate, 10 parts of diethyleneglycol bis (allylcarbonate) and 60 parts of diallyl isophthalate were mixed and stirred together and 0.1 part of 2-(2'-hydroxy-5'-methylphenyl)benzotriazole was added to the resulting mixture, to which 2.8 parts of diisopropylperoxydicarbonate were added and mixed thoroughly. An undissolved portion of the mixture was then filtered off and the remaining portion was cast into the mold and polymerized in the same way as at (a).

(f) 10 parts of di-o-chlorobenzyl itaconate, 10 parts of dibenzyl mesaconate, 30 parts of diethyleneglycol bis (allylcarbonate) and 50 parts of diallyl isophthalate were mixed and stirred together and 0.2 part of 2-hydroxy-4-methoxybenzophenone was added to the resulting mixture, to which 2.8 parts of diisopropylperoxydicarbonate were added and mixed thoroughly. An undissolved portion of the mixture was filtered off and the remaining portion was cast into the mold and polymerized by the same operation as at (a).

(g) 30 parts of dibenzyl itaconate and 70 parts of diallyl isophthalate were mixed and stirred and 0.1 part of 2-(2'-hydroxy-5'-methylphenyl)benzotriazole was added to the resulting mixture, to which 2.5 parts of diisopropylperoxydicarbonate were added and mixed thoroughly. An undissolved portion of the mixture was filtered off and the remaining portion was cast into the mold and polymerized by the same procedure as at (a).

(h) 7 parts of dibenzyl itaconate, 13 parts of diethyleneglycol bis (allylcarbonate) and 80 parts of diallyl isophthalate were mixed and stirred together and 0.1 part of 2-(2'-hydroxy-5'-methylphenyl) benzotriazole was added to the resulting mixture, to which 2.8 parts of diisopropylperoxydicarbonate were added and stirred thoroughly. An undissolved portion of the mixture was filtered off and the remaining portion was castd into the mold and polymerized by the same operation as at (a).

The refractive indices of the synthetic resin lenses, prepared by the methods of (a) to (h) above, are shown in Table 1.

Experiments
Preparation of Coating Solution (i) To a solution containing 30.5 parts of γ-glycidoxypropyltrimethoxysilane, 15.5 parts of colloidal silica dispersed in isopropyl alcohol ("OSCAL 1432" produced by Shokubai Kasei Kogyo KK; solid contents, 30%) and 40.5 parts of isopropyl alcohol was added gradually 8.5 parts of 0.05 N hydrochloric acid, while the solution was stirred, to effect the hydrolysis. The reaction mixture was then stirred further at room temperature for two hours and aged at 0° C. for 24 hours. After aging, to the mixture were added 4.7 parts of 1,4-butanediol and 3 parts of magnesium perchlorate and stirred to form a homogeneous mixture, to which 0.3 part of a flow controller ("L-7001" produced by Nippon Unicar Co., Ltd.) was added to produce a coating solution.

(ii) To a solution containing 108 parts of methyltrimethoxysilane, 212 parts of colloidal silica dispersed in isopropanol ("OSCAL-1432", produced by Shokubai Kasei Kogyo KK; solid content 30%) and 439 parts of isopropanol were added gradually 52 parts of 0.05 N hydrochloric acid to effect the hydrolysis. After the solution was aged at 0° C. for 24 hours, 183 parts of 1,6-hexanedioldiglycidyl ether ("Epolite 160", produced by Kyoeisha Oil and Fats Co., Ltd.) and 5 parts of aluminum acetyl acetonate were added to the aged solution, which was then stirred to form a homogeneous mixture. Several droplets of the flow controller ("L-7604", produced by Nippon Unicar Co. Ltd.) were added to a mixture to produce a coating solution.

(iii) To a solution containing 25 parts of γ-glycidoxypropyltrimethoxysilane, 12.5 parts of colloidal silica dispersed in methanol ("Methanol Silicasol" produced by Niassan Kagaku KK; solid contents, 30%) and 46.5 parts of ethyl cellosolve were added 7 parts of 0.05 N hydrochloric acid gradually to effect the hydrolysis. The resulting mixture was then stirred at room temperature for two hours and aged at 0° C. for 24 hours. After aging, 85 parts of glycerin diglycidylether ("Denacol EX 313", produced by Nagase Sangyo KK) and 4 parts of tin chloride ($SnCl_2$) were added to the aged solution and mixed to form a homogeneous mixture, to which several droplets of the flow controller L-7604 were added to produce a coating solution.

(iv) To 71 parts of γ-glycidoxypropylmethyldiethoxysilane were added 80 parts of isopropyl alcohol and then 10 parts of 0.05 N hydrochloric acid gradually dropwise, while the mixture was stirred, to effect the hydrolysis. After the dropwise addition, the resulting product was aged at room temperature for 24 hours. To the resulting solution were added 17 parts of colloidal silica ("Methanol Silicasol" produced by Nissan Kagaku Kogyo KK; solid contents, 30%) and stirred to form a uniform mixture, to which several droplets of the flow controller L-7604 were added to produce the coating solution.

Examples 1 to 11

The synthetic resin lens bodies produced by the Experiments (a) to (f) were surface-treated with a 4% aqueous solution of sodium hydroxide, rinsed and dried. The surface-treated lens bodies were then dipped in the coating solutions prepared by the Experiments (i) to (iv) and lifted at a rate of 20 cm per minute to deposit the coat on the lens body. The coated lenses were immediately dried with hot air at 80° C. for one hour and at 130° C. for one hour to effect curing. The various combinations of the synthetic rsins and the coating solutions are shown in Table 1.

The lens samples produced were tested with respect to the following test items. The results are also shown in Table 1.

(1) Abrasion resistance: #0000 steel wool was moved back and forth ten times in contact with the coating at a load of 1 kg/cm$^2$ in order to check the state of the coating. In the Table, A indicates that almost no scars are formed; B indicates that some scars are formed; and C indicates that many scars are formed.

(2) Adhesion: After the lens samples were dipped for two hours in hot water at 100° C., scars were formed in the form of 11 parallel lines with a knife both longitudinally and transversely of the lens surface at intervals of 1 mm to form 100 square sections. A cellophane tape was affixed to the lens surface and then peeled off, and the number of the sections remaining affixed to the lens surface was counted and used as the indication of adhesion.

(3) External appearance: The degree of lens coloration after the formation of the coating was evaluated with naked eyes.

(4) Impact resistance: A steel ball weighing 44.7 g was dropped from the height of 127 cm. The lens samples that passed the test were marked and those that failed in the test were marked X.

(5) Tintability: One bottleful of a GRAY dyestuff was dissolved in 950 ml of pure water at 95° C. to produce a dyestuff solution. The synthetic lens samples were dipped in this solution for 10 minutes and the light transmittance through the tinted lens samples of the monochromatic light at 510 nm was measured.

(6) Weather proof property: The external appearance of the coating after irradiation with UV light rays for 500 hours was checked with a Xenon lamp fademeter as an indication of the property.

Comparative Examples 1 to 4

Using the lens body coating combinations shown in Table 1, coated lenses were produced by the same operation as in the preceding Examples, and tested in the same way as in Example 1. The results are shown in Table 1.

It is seen from Table 1 that the synthetic resin lens samples having the surface hard coatings according to the present invention are excellent in refractive index, adhesion and durability. However, the lens samples of the Comparative Examples 2 and 3 exhibit poor coating adhesion on account of the absence of diethyleneglycol bis (allylcarbonate) in the composition. The lens sample of the Comparative Example 4 exhibit yellow lens coloring and poor coating adhesion since the contents of diester of dicarboxylic acid are less than 10 percent by weight. The lens samples of the Comparative Examples 1 and 3 exhibit poor durability of the coating and poor tintability since the requirements for the coating composition of the present invention are not satisfied.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A synthetic resin lens having a surface hard coating comprising:
   a synthetic resin lens body; and
   a surface hard coat deposited on the lens body; the synthetic resin lens body being made of a resin obtained by copolymerizing monomers consisting essentially as synthetic resinous components of;
   10 to 80 percent by weight of at least one diester of dicarboxylic acid having the following formula (1) of

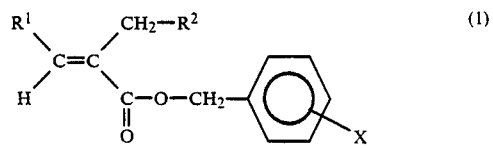

wherein $R^1$ and $R^2$ are different groups, one of $R^1$ and $R^2$ being a hydrogen atom, the other being

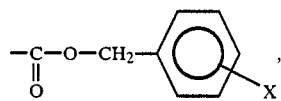

and X represents a hydrogen atom, a chlorine atom, a bromine atom or an iodine atom,

TABLE 1

| | Material of Lens | Refractive Index | Coating | Abrasion Resistance | Adhesion | External Appearance | Impact Resistance | Tintability | Weather Proof Property |
|---|---|---|---|---|---|---|---|---|---|
| Example 1 | a | 1.553 | (i) | A | 100/100 | Good | O | 49% | Pass |
| 2 | a | " | (ii) | A | 100/100 | Good | O | 46 | Pass |
| 3 | a | " | (iii) | A | 100/100 | Good | O | 42 | Pass |
| 4 | b | 1.570 | (i) | A | 100/100 | Good | O | 50 | Pass |
| 5 | b | " | (iii) | A | 100/100 | Good | O | 47 | Pass |
| 6 | c | 1.570 | (ii) | A | 100/100 | Good | O | 45 | Pass |
| 7 | d | 1.558 | (iii) | A | 100/100 | Good | O | 41 | Pass |
| 8 | e | 1.572 | (ii) | A | 100/100 | Good | O | 50 | Pass |
| 9 | e | " | (iii) | A | 100/100 | Good | O | 46 | Pass |
| 10 | f | 1.554 | (i) | A | 100/100 | Good | O | 42 | Pass |
| 11 | f | " | (iii) | A | 100/100 | Good | O | 40 | Pass |
| Comparative Example 1 | a | 1.553 | (iv) | C | 80/100 | Good | O | 75 | Pass |
| 2 | g | 1.573 | (i) | B | 80/100 | Good | O | 48 | Pass |
| 3 | g | " | (iv) | C | 60/100 | Good | O | 72 | Pass |
| 4 | h | 1.550 | (i) | B | 90/100 | Yellow | O | 47 | Pass |

10 to 80 percent by weight of at least one allyl compound having the following formula (2) of $$R^3 + C-O-CH_2-CH=CH_2)_2 \quad (2)$$
$$\parallel$$
$$O$$

wherein $R^3$ represents $-(O-CH_2-CH_{2n})-O-$,

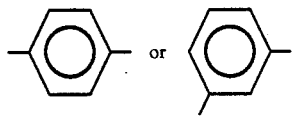

and n represents an integer of 1 or 3, and 5 to 50 percent by weight of diethyleneglycol bis(allylcarbonate),
said surface hard coat being formed by curing a coating composition comprising;
50 to 800 parts by weight of at least one organic silicon compound having the following formula (3) of $$R^4-Si+OR^6)_{3-a} \quad (3)$$
$$\overset{R^5_a}{|}$$

wherein $R^4$ represents a hydrocarbon group having 1 to 6 carbon atoms, or an organic group including a vinyl group, a methacryloxy group of an epoxy group. $R^5$ represents a hydrocarbon group having 1 to 4 carbon atoms, $R^6$ represents a hydrogen atom, a hydrocarbon group having 1 to 5 carbon atoms or an alkoxyalkyl group and the symbol a represents an integer of 0 or 1,
100 parts by weight of colloidal silica having a particle size of 1 to 100 millimicrons.
50 to 600 parts by weight of a polyfunctional compound selected from the group consisting of a polyfunctional epoxy compound, a polyalcohol, a polycarboxylic acid, a polycarboxylic anhydride, and mixtures thereof, and
0.01 to 5.0 percent by weight of a curing catalyst based on the residual solids in the composition after curing.

2. A synthetic resin lens according to claim 1 wherein the diester of dicarboxylic acid represented by the formula (1) is selected from the group consisting of dibenzyl itaconate, di-o-chlorobenzyl itaconate, di-p-chlorobenzyl itaconate, di-o-bromobenzyl itaconate, dibenzyl mesaconate, di-o-chlorobenzyl mesaconate, di-p-chlorobenzyl mesaconate, di-o-bromobenzyl mesaconate and mixtures thereof.

3. A synthetic resin lens according to claim 1 wherein the allyl compound represented by the formula (2) is selected from the group consisting of diallyl isophthalate, diallyl terephthalate and mixtures thereof.

4. A synthetic resin lens according to claim 1 wherein the organic silicon compound represented by the formula (3) is selected from the group consisting of methyltrimethoxysilane, ethyltriethoxysilane, methyltriethoxysilane, phenyltriethoxysilane. dimethyldimethoxysilane, phenylmethyldimethoxysilane, vinyltriethoxysilane, vinyltris($\beta$-methoxyethoxy)silane. vinyltriacetoxysilane, $\gamma$-glycidoxypropyltrimethoxysilane, $\gamma$-glycidoxypropylmethyldiethoxysilane, $\beta$-(3,4-epoxycyclohexyl)ethyltrimethoxysilane and mixtures thereof.

5. A synthetic resin lens according to claim 1 wherein the polyfunctional epoxy compound is a diglycidyl ether of a bifunctional alcohol.

6. A synthetic resin lens according to claim 5 wherein said bifunctional alcohol is selected from the group consisting of (poly)ethyleneglycol, (poly propyleneglycol, neopentylglycol, catechol, resorcinol, alkyleneglycol and mixtures thereof.

7. A synthetic resin lens according to claim 1 wherein said polyfunctional epoxy compound is selected from the group consisting of diglycidyl ether and triglycidyl ether of a trifunctional alcohol and mixtures thereof.

8. A synthetic resin lens according to claim 7 wherein said trifunctional alcohol is selected from the group consisting of glycerin, trimethylolpropane and mixtures thereof.

9. A synthetic resin lens according to claim 1 wherein said polyalcohol is selected from th: group consisting of (poly)ethyleneglycol, (poly)propyleneglycol, neopentylglycol, catechol, resorcinol, alkanadiol, glycerin, trimethylolpropane, polyvinyl alcohol and mixtures thereof.

10. A synthetic resin lens according to claim 1 wherein said polycarboxylic acid is selected from the group consisting of malonic acid, succinic acid, adipic acid, azelaic acid, maleic acid, o-phthalic acid, terephthalic acid, fumaric acid, itaconic acid, oxaloacetic acid and mixtures thereof.

11. A synthetic resin lens according to claim 1 wherein said polycarboxylic anhydride is selected from the group consisting of succinic anhydride, malaic anhydride, itaconic anhydride, 1,2 dimethylmaleic anhydride, phthalic anhydride, hexahydrophthalic anhydride, naphthalic anhydride and mixtures thereof.

12. A synthetic resin lens according to claim 1 wherein said curing catalyst is selected from the group consisting of amines, amino acids, metal acetyl acetonates, metal salts of organic acids, perchloric acids, salts of perchloric acids, acids and metal chlorides.

13. A synthetic resin lens according to claim 1 wherein said curing catalyst is selected from the group consisting of n-butylamine, triethylamine, guanidine, biguanide, glycine, aluminum acetyl acetonate, chromium acetyl acetonate, titanyl acetyl acetonate, cobalt acetyl acetonate, sodium acetate, zinc naphtenate, cobalt naphthenate, zinc octylate, tin octylate, perchloric acids, ammonium perchlorate, magnesium perchlorate, hydrochloric acid, phosphoric acid, nitric acid, paratoluenesulfonic acid, $SnCl_2$, $AlCl_3$, $FeCl_3$, $TiCl_4$, $ZnCl_2$ and $SbCl_3$ 14. A synthetic resin lens according to claim 1 wherein the surface hard coat deposited on the synthetic resin lens body has a thickness of 1 to 30 microns.

15. A synthetic resin lens according to claim 1 wherein the diester of dicarboxylic acid represented by the formula (1) is selected from the group consisting of dibenzyl mesconate, dibenzyl itaconate and mixtures thereof.

16. A synthetic resin lens according to claim 1 wherein the allyl compound represented by the formula (2) is diallyl isophthalate.

17. A synthetic resin lens according to claim 1 wherein the organic silicon compound represented by the formula (3) is $\gamma$-glycidoxypropyltrimethoxysilane.

18. A synthetic resin lens having a surface hard coating comprising:
a synthetic resin lens body; and a surface hard coat deposited on the lens body; the synthetic resin lens body being made of a resin obtained by copolymerizing monomers consisting essentially as synthetic resinous components of;
10 to 80 percent by weight of at least one diester of dicarboxylic acid having the following formula (1) of

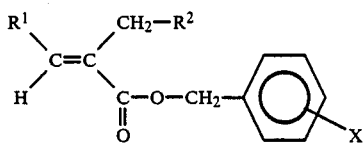

wherein $R^1$ and $R^2$ are different groups, one of $R^1$ and $R^2$ being a hydrogen atom, the other being

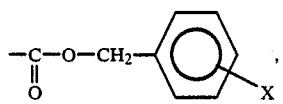

and X represents a hydrogen atom,
10 to 80 percent by weight of at least one allyl compound having the following formula (2) of

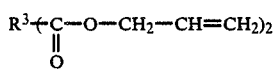

wherein $R^3$ represents

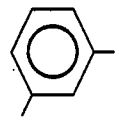

and 5 to 50 percent by weight of diethyleneglycol bis-(allylcarbonate),
said surface hard coat being formed by curing a coating composition comprising;
50 to 800 parts by weight of at least one organic silicon compound having the following formula (3) of

wherein $R^4$ represents an organic group including an epoxy group, $R^6$ represents a hydrocarbon group having 1 to 5 carbon atoms and the symbol a represents an integer of 0,
100 parts by weight of colloidal silica having a particle size of 1 to 100 millimicrons,
50 to 600 parts by weight of a polyfunctional compound selected from the group consisting of a polyfunctional epoxy compound and
0.01 to 5.0 percent by weight of a curing catalyst based on the residual solids in the composition after curing.

* * * * *

UNITED STATES PATENT AND TRADEMARK OFFICE
CERTIFICATE OF CORRECTION

PATENT NO. : 4,930,879

DATED : JUNE 5, 1990

INVENTOR(S) : TAKEAKI IRYO et al

It is certified that error appears in the above-identified patent and that said Letters Patent is hereby corrected as shown below:

Column 13, line 8, in Claim 1: replace

"wherein $R^3$ represents $+O-CH_2-CH_{2n}+O-$, "

with

— wherein $R^3$ represents $+O-CH_2-CH_2 \frac{}{n} O-$, —

Column 13, line 37, in Claim 1:

delete "." after millimicrons
      insert --,-- after millimicrons

Column 13, line 63, in Claim 4:

delete "." after phenyltriethoxysilane
      insert --,-- after pheyltriethoxysilane Column 13, line 65, in Claim 4:

delete "." after vinyltris($\beta$-methoxyethoxy)silane
      insert --,-- after vinyltris($\beta$-methoxyethoxy)silane

UNITED STATES PATENT AND TRADEMARK OFFICE
CERTIFICATE OF CORRECTION

PATENT NO. : 4,930,879

DATED : JUNE 5, 1990

INVENTOR(S) : TAKEAKI IRYO et al

It is certified that error appears in the above-identified patent and that said Letters Patent is hereby corrected as shown below:

Column 14, line 18, in Claim 9:

delete "th:" after the word 'from'
        insert --the-- after the word 'from'

Signed and Sealed this

Twenty-sixth Day of November, 1991

*Attest:*

HARRY F. MANBECK, JR.

*Attesting Officer*      *Commissioner of Patents and Trademarks*